US011884013B2

(12) United States Patent
Abe et al.

(10) Patent No.: US 11,884,013 B2
(45) Date of Patent: Jan. 30, 2024

(54) THREE-DIMENSIONAL MODELING DEVICE AND METHOD OF MANUFACTURING THREE-DIMENSIONAL SHAPED ARTICLE

(71) Applicant: SEIKO EPSON CORPORATION, Tokyo (JP)

(72) Inventors: Hironobu Abe, Sakata (JP); Toshiyuki Ishigaki, Sakata (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/660,943

(22) Filed: Apr. 27, 2022

(65) Prior Publication Data

US 2022/0355544 A1 Nov. 10, 2022

(30) Foreign Application Priority Data

Apr. 30, 2021 (JP) ................................ 2021-077276

(51) Int. Cl.
*B29C 64/118* (2017.01)
*B29C 64/295* (2017.01)
(Continued)

(52) U.S. Cl.
CPC .......... *B29C 64/209* (2017.08); *B29C 64/118* (2017.08); *B29C 64/295* (2017.08); (Continued)

(58) Field of Classification Search
CPC ... B29C 64/209; B29C 64/118; B29C 64/295; B29C 64/227; B29C 64/393; B33Y 10/00; B33Y 30/00; B33Y 50/02
See application file for complete search history.

(56) References Cited

U.S. PATENT DOCUMENTS 5,252,264 A * 10/1993 Forderhase ........... B22F 12/224 156/272.8
2008/0262659 A1* 10/2008 Huskamp ........... G05D 23/1919 700/207

(Continued)

FOREIGN PATENT DOCUMENTS

CN 103331912 A 10/2013
EP 3756856 12/2020

(Continued)

*Primary Examiner* — Joseph S Del Sole
*Assistant Examiner* — Baileigh Kate Darnell
(74) *Attorney, Agent, or Firm* — WORKMAN NYDEGGER

(57) ABSTRACT

A three-dimensional modeling device includes a plasticizing section for plasticizing a material to generate a shaping material, a stage on which the shaping material is stacked, a nozzle which has a nozzle opening, and ejects the shaping material from the nozzle opening toward a modeling area on the stage, a transfer mechanism section for changing a relative position between the nozzle and the stage, and a heating section having a heater and a heating member for heating the shaping material stacked in the modeling area with heat supplied from the heater. The nozzle opening is located between the stage and the heating section in a stacking direction of the shaping material, the heating section is configured so that a relative position to the stage changes together with the nozzle, and the heating member covers at least the modeling area when viewed along the stacking direction.

12 Claims, 9 Drawing Sheets

100
500
430
20a,20
20b,20
431
200a,200
200b,200
30a,30
30b,30
600
61a,61
61b,61
311
300
400
410
420
Z
Y
X

(51) Int. Cl.

| | |
|---|---|
| ***B33Y 10/00*** | (2015.01) |
| ***B33Y 30/00*** | (2015.01) |
| ***B29C 64/209*** | (2017.01) |
| *B29K 101/12* | (2006.01) |

(52) U.S. Cl.

CPC ............... *B33Y 10/00* (2014.12); *B33Y 30/00* (2014.12); *B29K 2101/12* (2013.01)

(56) References Cited

U.S. PATENT DOCUMENTS

| | | | | |
|---|---|---|---|---|
| 2009/0321002 | A1* | 12/2009 | Spengler | B29C 51/004 156/500 |
| 2017/0334137 | A1* | 11/2017 | Nystrom | B29C 64/393 |
| 2018/0200955 | A1 | 7/2018 | Hoelldorfer et al. | |
| 2018/0326658 | A1* | 11/2018 | Saito | B29C 64/20 |
| 2020/0316866 | A1* | 10/2020 | Jain | B29C 64/118 |
| 2021/0078256 | A1 | 3/2021 | Anegawa | |

FOREIGN PATENT DOCUMENTS

| | | | |
|---|---|---|---|
| JP | 2017-523063 | A | 8/2017 |
| JP | 2019-064090 | | 4/2019 |
| JP | 2021-041626 | A | 3/2021 |
| WO | 2015/193819 | A | 12/2015 |

* cited by examiner 100
500
200a,200
30a,30
20a,20
22
32
M
RX
31
41
40
47
45
52
42
50a,50
58a,58
56
65
623
632
63a,63
61a,61
62a,62
62b,62
300
311
20b,20
200b,200
30b,30
50b,50
58b,58
624
633
63b,63
61b,61
600
631,630
621,620
400
X
Y
Z Y
Z
X
623
622,621,620
631,630
611,610
225
215
220
211
611,610
611,610
210
632
611,610
633
225
611,610
625
641
600
621,620
625
624
611,610
C1
C2
C3
C4
C5

210
216
217
223
222
225
221
220
215
211
637,636
624
634
622,621,620
X
Y
Z
C1
C2
C3
C4
C5
600
630
625
621,620
623
632
638,636
611,610
631

623
622,621,620
631,630
Y
Z
X
215
220
225
211
210
632
633
225
625
641
600B
621,620
625
611B,610B
624
C1
C2
C3
C4
C5

THREE-DIMENSIONAL MODELING DEVICE AND METHOD OF MANUFACTURING THREE-DIMENSIONAL SHAPED ARTICLE

The present application is based on, and claims priority from JP Application Serial Number 2021-077276, filed Apr. 30, 2021, the disclosure of which is hereby incorporated by reference herein in its entirety.

BACKGROUND

1. Technical Field

The present disclosure relates to a three-dimensional modeling device and a method of manufacturing a three-dimensional shaped article.

2. Related Art

Regarding a three-dimensional modeling device, for example, in a device described in JP-T-2017-523063 (Document 1; the term "JP-T" as used herein means a published Japanese translation of a PCT patent application), by heating an existing layer using an energy source coupled to a head via a support arm, and then stacking a subsequent layer on the existing layer thus heated, adhesiveness between the existing layer and the subsequent layer is enhanced.

In the device described in Document 1, in order to stack the subsequent layer on the existing layer thus heated, it is necessary to heat a position ahead of a nozzle. Therefore, it is necessary to move the energy source to a position where the position ahead of the nozzle can be heated every time the moving direction of the nozzle is changed in some cases, and thus, the control becomes complicated in some cases.

SUMMARY

According to a first aspect of the present disclosure, there is provided a three-dimensional modeling device. The three-dimensional modeling device includes a plasticizing section configured to plasticize a material to generate a shaping material, a stage on which the shaping material is stacked, a nozzle which has a nozzle opening, and is configured to eject the shaping material from the nozzle opening toward a modeling area on the stage, a transfer mechanism section configured to change a relative position between the nozzle and the stage, and a heating section having a heater and a heating member configured to heat the shaping material stacked in the modeling area with heat supplied from the heater. The nozzle opening is located between the stage and the heating section in a stacking direction of the shaping material, the heating section is configured so that a relative position to the stage changes together with the nozzle, and the heating member covers at least the modeling area when viewed along the stacking direction.

According to a second aspect of the present disclosure, there is provided a method of manufacturing a three-dimensional shaped article. The method of manufacturing a three-dimensional shaped article includes a stacking step of ejecting a shaping material generated by plasticizing a material toward a modeling area on a stage from a nozzle opening while moving a nozzle having the nozzle opening relatively to the stage to stack a layer of the shaping material in the modeling area. In the stacking step, the shaping material stacked in the modeling area is heated by a heating member while moving the heating member arranged above the nozzle opening relatively to the stage together with the nozzle, and the heating member covers at least the modeling area when viewed along a stacking direction of the shaping material.

DESCRIPTION OF EXEMPLARY EMBODIMENTS

A. First Embodiment

Figure 1:
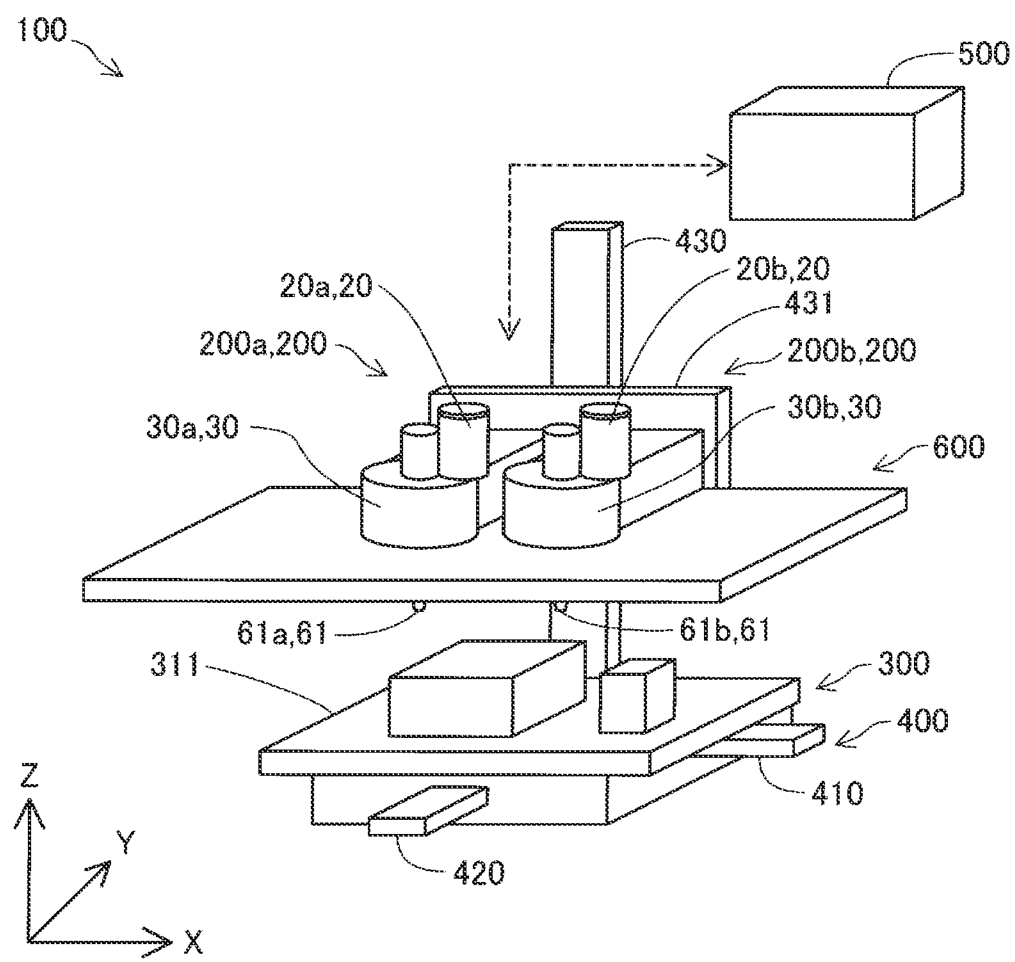
FIG. 1 is a first diagram showing a schematic configuration of a three-dimensional modeling device according to a first embodiment.
Figure 2:
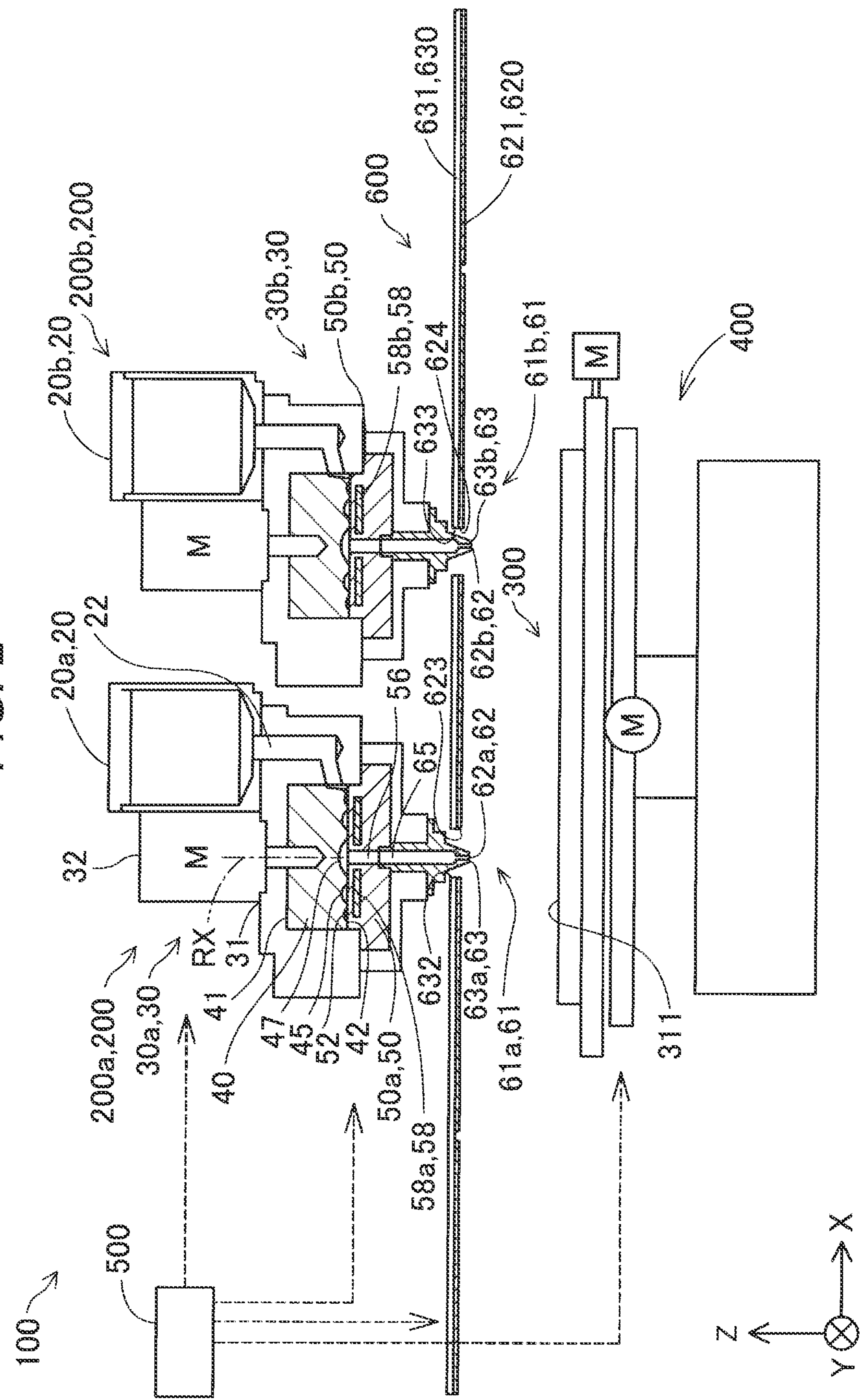
FIG. 2 is a second diagram showing the schematic configuration of the three-dimensional modeling device according to the first embodiment.

FIG. 1 is a first diagram showing a schematic configuration of a three-dimensional modeling device 100 according to a first embodiment. FIG. 2 is a second diagram showing the schematic configuration of the three-dimensional modeling device 100 according to the first embodiment. In FIG. 1 and FIG. 2, there are shown arrows along X, Y, and Z directions perpendicular to each other, respectively. The X, Y, and Z directions are respectively directions along an X axis, a Y axis, and a Z axis as three spatial axes perpendicular to each other, and each include both of a direction toward one side along the X axis, the Y axis, or the Z axis, and an opposite direction thereof. The X axis and the Y axis are axes along a horizontal plane, and the Z axis is an axis along a vertical line. A −Z direction is a vertical direction, and a +Z direction is a direction opposite to the vertical direction. The −Z direction is also referred to as "below," and the +Z direction is also referred to as "above." In other drawings, there are arbitrarily shown the arrows along the X, Y, and Z directions, respectively. The X, Y, and Z directions in FIG. 1 and FIG. 2, and the X, Y, and Z directions in other drawings represent the same directions, respectively. Further, in the present specification, "perpendicular" includes a range of 90°±10°.

The three-dimensional modeling device 100 is provided with modeling sections 200, a stage 300, a transfer mechanism section 400, a control section 500, and a heating section 600.

The control section 500 is a control device for controlling an overall operation of the three-dimensional modeling device 100. The control section 500 is formed of a computer provided with a single processor or a plurality of processors, a memory, and an input/output interface for performing input/output of a signal with the outside. The control section 500 exerts a variety of functions such as a function of executing a three-dimensional modeling process described later by the processor executing a program and commands retrieved on the memory. The control device 500 can be realized by a configuration obtained by combining a plurality of circuits for realizing at least a part of the functions with each other instead of being formed of the computer. The control section 500 is also referred to as an information processing device in some cases.

Under the control by the control section 500, the modeling sections 200 each eject a shaping material in a paste state formed by melting a material in a solid state on the stage 300 for modeling which forms a base of a three-dimensional shaped article. The modeling sections 200 are each provided with a material supply section 20 as a supply source of the material which has not been transformed into the shaping material, a plasticizing section 30 for plasticizing the material to generate the shaping material, and nozzles 61 for ejecting the shaping material thus generated. The modeling sections 200 are each referred to as a head in some cases.

As the modeling sections 200, the three-dimensional modeling device 100 according to the present embodiment is provided with a first modeling section 200*a* and a second modeling section 200*b*. The first modeling section 200*a* is provided with a first material supply section 20*a* as the material supply section 20, and is provided with a first plasticizing section 30*a* as the plasticizing section 30, and is provided with a first nozzle 61*a* as the nozzle 61. The second modeling section 200*b* is provided with a second material supply section 20*b* as the material supply section 20, and is provided with a second plasticizing section 30*b* as the plasticizing section 30, and is provided with a second nozzle 61*b* as the nozzle 61. In the present embodiment, the first modeling section 200*a* and the second modeling section 200*b* are arranged side by side in the X direction so that the position in the Y direction of the first nozzle 61*a* and the position in the Y direction of the second nozzle 61*b* coincide with each other. The second modeling section 200*b* is located at the +X direction side of the first modeling section 200*a*. The configuration of the first modeling section 200*a* and the configuration of the second modeling section 200*b* are substantially the same as each other, and when the first modeling section 200*a* and the second modeling section 200*b* are not particularly distinguished from each other, both of the modeling sections are hereinafter referred to as the modeling sections 200 in some cases. Further, when distinguishing the constituent members of the both from each other, the constituent members of the first modeling section 200*a* are denoted by the reference symbols attached with "a," and the constituent members of the second modeling section 200*b* are denoted by the reference symbols attached with "b."

In the material supply sections 20, there is housed a material in the form of a pellet, a powder, or the like. In the present embodiment, ABS resin formed to have a pellet shape is used as the material. The material supply sections 20 in the present embodiment are each formed of a hopper. As shown in FIG. 2, a supply channel 22 for coupling the material supply section 20 and the plasticizing section 30 to each other is disposed below the material supply section 20. The material supply section 20 supplies the plasticizing section 30 with the material via the supply channel 22.

It should be noted that the details of the material will be described later.

As shown in FIG. 2, the plasticizing section 30 is provided with a screw case 31, a drive motor 32, a screw 40, and a barrel 50. The plasticizing section 30 plasticizes at least a part of the material supplied from the material supply section 20 to generate the shaping material in the paste form having fluidity, and then supplies the shaping material to the nozzle 61. The term "plasticization" means that heat is applied to the material having the thermoplastic property to melt the material. The term "melt" not only means that the material having a thermoplastic property is heated at a temperature no lower than the melting point to thereby be in a liquid form, but also means that the material having the thermoplastic property is heated at a temperature no lower than a glass-transition point to thereby be plasticized to develop the fluidity. It should be noted that the screw 40 in the present embodiment is a so-called a flat screw, and is called a "scroll" in some cases.

The screw case 31 is a chassis for housing the screw 40. The barrel 50 is fixed to the lower surface of the screw case 31, and the screw 40 is housed in a space surrounded by the screw case 31 and the barrel 50. On a surface opposed to the barrel 50, the screw 40 has a groove formation surface 42 provided with grooves 45. To the upper surface of the screw case 31, there is fixed the drive motor 32. The rotary shaft of the drive motor 32 is coupled at an upper surface 41 side of the screw 40. It should be noted that the drive motor 32 cannot directly be coupled to the screw 40, and for example, the screw 40 and the drive motor 32 can be coupled to each other via a reduction mechanism. The drive motor 32 is driven under the control by the control section 500.

The barrel 50 is arranged blow the screw 40. The barrel 50 has an opposed surface 52 opposed to the groove formation surface 42 of the screw 40. The barrel 50 is provided with a communication hole 56 communicated with a nozzle flow channel 65 of the nozzle 61 described later disposed on a central axis RX of the screw 40. In the barrel 50, there is incorporated a plasticizing heater 58 at a position opposed to the grooves 45 of the screw 40. The temperature of the plasticizing heater 58 is controlled by the control section 500.

Figure 3:
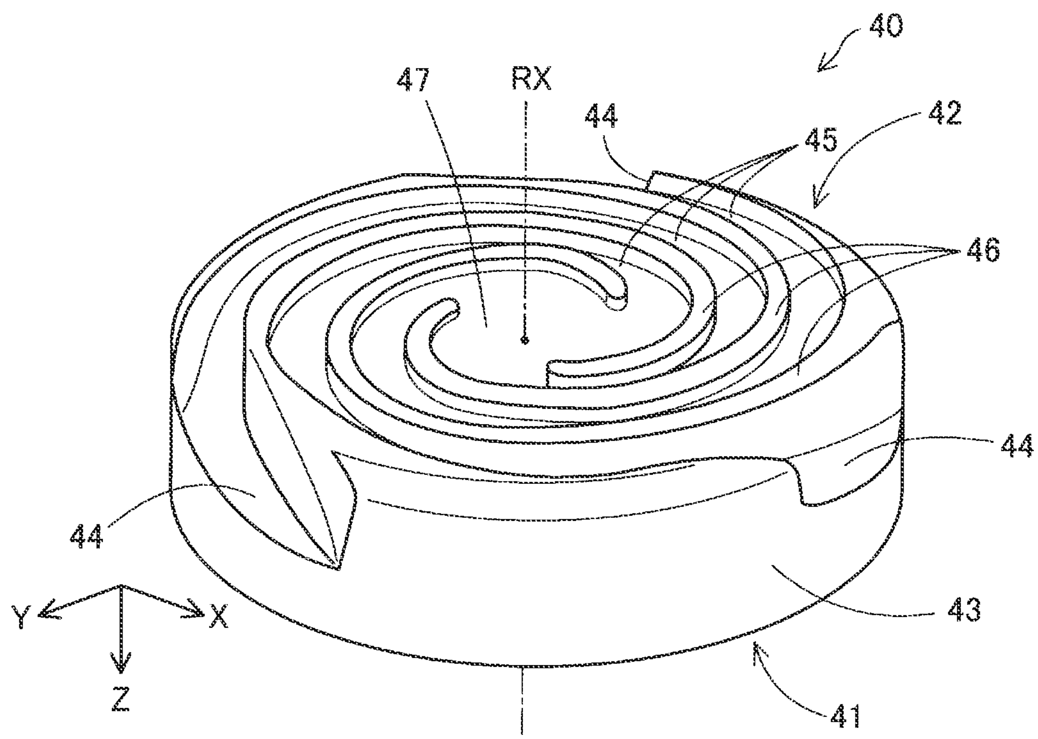
FIG. 3 is a schematic perspective view showing a configuration at a groove forming surface side of a screw.

FIG. 3 is a schematic perspective view showing a configuration at the groove formation surface 42 side of the screw 40. A central part 47 of the groove formation surface 42 of the screw 40 is formed as a recess to which one ends of the grooves 45 are coupled. The central part 47 is opposed to the communication hole 56 of the barrel 50 shown in FIG. 2. The central part 47 crosses the central axis RX.

The grooves 45 each form a so-called scrolling groove. The grooves 45 each extend in a vortical manner from the central part 47 toward an outer circumference of the screw 40 so as to draw an arc. The grooves 45 can also be formed so as to extend forming an involute-curved shape or a spiral shape. The groove formation surface 42 is provided with protruding line parts 46 each constituting a sidewall part of the groove 45, and extending along each of the grooves 45. The grooves 45 each continue to a material introduction port 44 formed on a side surface 43 of the screw 40. The material introduction port 44 is a part for receiving the material supplied via the supply channel 22 of the material supply section 20. As shown in FIG. 2, in the present embodiment, there are formed three grooves 45 partitioned by the protruding line parts 46. It should be noted that the number of the grooves 45 is not limited to three, and can be one, or two or more. The shape of the grooves 45 is not limited to the vortical shape, and can be a spiral shape, an involute curve shape, or a shape extending toward the outer circumference from the central part so as to draw an arc.

Figure 4:
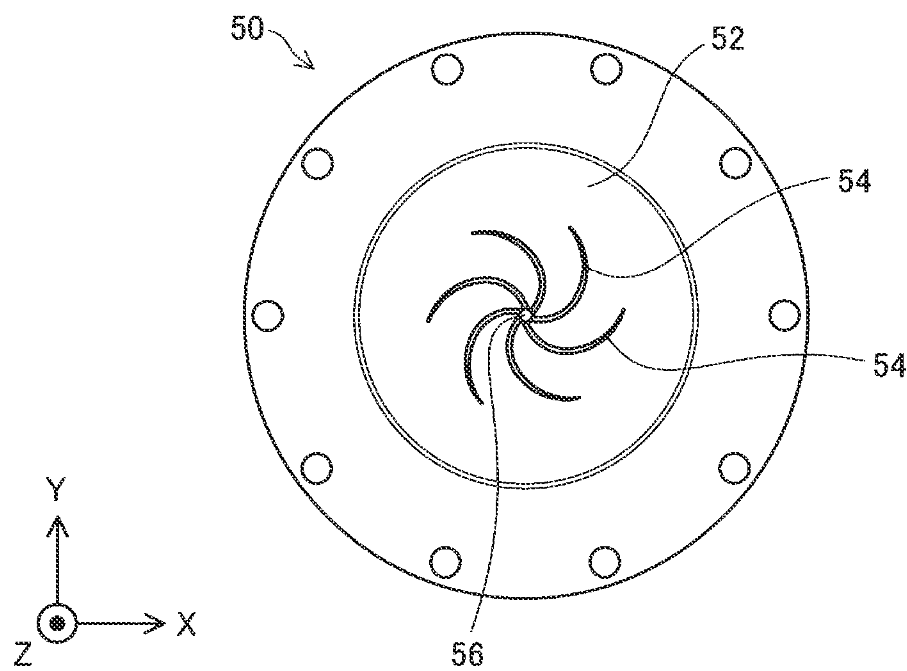
FIG. 4 is a top view showing a configuration at an opposed surface side of a barrel.

FIG. 4 is a top view showing a configuration at the opposed surface 52 side of the barrel 50. As described above, at the center of the opposed surface 52, there is formed the communication hole 56. On the periphery of the communication hole 56 in the opposed surface 52, there is formed a plurality of guide grooves 54. Each of the guide grooves 54 is coupled to the communication hole 56 at one end thereof, and extends in a vortical manner from the communication hole 56 toward the outer circumference of the opposed surface 52. Each of the guide grooves 54 has a function of guiding the shaping material to the communication hole 56. It should be noted that one ends of the guide grooves 54 are not required to be coupled to the communication hole 56. Further, the barrel 50 is not required to be provided with the guide grooves 54.

As shown in FIG. 2, the nozzles 61 are each provided with the nozzle flow channel 65 and a tip surface 63 provided with a nozzle opening 62. The nozzle flow channel 65 is a flow channel of the shaping material formed in the nozzle 61, and is coupled to the communication hole 56 of the barrel 50 described above. The tip surface 63 is a surface constituting a tip portion of the nozzle 61 projecting in the −Z direction toward the stage 300. The nozzle opening 62 is a portion which is disposed at an end part at the side communicated with the atmosphere of the nozzle flow channel 65, and is a portion reduced in flow channel cross-section of the nozzle flow channel 65. The shaping material generated by the plasticizing section 30 is supplied to the nozzle 61 via the communication hole 56, and is ejected from the nozzle opening 62 via the nozzle flow channel 65.

As shown in FIG. 1 and FIG. 2, the stage 300 is arranged at a position opposed to the tip surface 63 of the nozzle 61. The three-dimensional modeling device 100 ejects the shaping material from the nozzle opening 62 of the nozzle 61 to a modeling area on the stage 300 to stack a layer of the shaping material in the modeling area to thereby shape the three-dimensional shaped article. The modeling area means an area where the three-dimensional shaped article is shaped out of the areas on a stage upper surface 311 as an upper surface of the stage 300, and above the stage upper surface 311. In the present embodiment, the stage upper surface 311 is arranged so as to become parallel to the X direction and the Y direction. It should be noted that a direction in which the shaping material is stacked is referred to as a stacking direction in some cases. The stacking direction includes a direction toward one side along the same axis and an opposite direction, and a direction along the Z axis in the present embodiment.

The transfer mechanism section 400 changes the relative position between the nozzles 61 and the stage 300. In the present embodiment, the transfer mechanism section 400 moves the modeling sections 200 along the Z direction as the stacking direction, and moves the stage 300 in a direction crossing the stacking direction to thereby change the relative position between the nozzles 61 and the stage 300. More specifically, the transfer mechanism section 400 in the present embodiment moves the modeling section 200 along the Z direction to thereby change the relative position between the nozzles 61 and the stage 300 in the Z direction, and moves the stage 300 in the X direction and the Y direction perpendicular to the Z direction to thereby change the relative position between the nozzles 61 and the stage 300 in the X direction and the Y direction. As shown in FIG. 1, the transfer mechanism section 400 is formed of a first electric actuator 410 for moving the stage 300 along the X direction, a second electric actuator 420 for moving the stage 300 and the first electric actuator 410 along the Y direction, and a third electric actuator 430 for moving the modeling section 200 along the Z direction. More particularly, the third electric actuator 430 moves a movable part 431 to which the first modeling section 200*a* and the second modeling section 200*b* are fixed along the Z direction to thereby move the first modeling section 200*a* and the second modeling section 200*b* along the Z direction.

It should be noted that the heating section 600 is further fixed to the movable part 431 via a fixation member 210 shown in FIG. 5 and FIG. 6 described later. Therefore, the third electric actuator 430 in the present embodiment moves the heating section 600 along the Z direction together with the modeling sections 200 in a state in which the positional relationship between the modeling sections 200 and the heating section 600 is maintained. In other words, the heating section 600 is configured so that the relative position to the stage 300 changes together with the nozzles 61.

The electric actuators 410 through 430 described above are driven under the control by the control section 500. In another embodiment, it is possible for the transfer mechanism section 400, for example, to move the stage 300 in the Z direction, and move the modeling sections 200 along the X direction and the Y direction, or to move the stage 300 in the X direction, the Y direction, and the Z direction without moving the modeling sections 200, or to move the modeling sections 200 in the X direction, the Y direction, and the Z direction without moving the stage 300. It should be noted that the change in relative position of each of the nozzles 61 to the stage 300 is hereinafter referred to simply as a translation of the nozzle 61 in some cases. In the present embodiment, for example, a translation toward the +X direction of the stage 300 with respect to the nozzle 61 can be reworded as a translation toward the −X direction of the nozzle 61. Further, similarly, the change in relative position of each of the modeling sections 200 or the heating section 600 described later to the stage 300 is referred to simply as a translation of the modeling section 200 or the heating section 600 in some cases.

Figure 5:
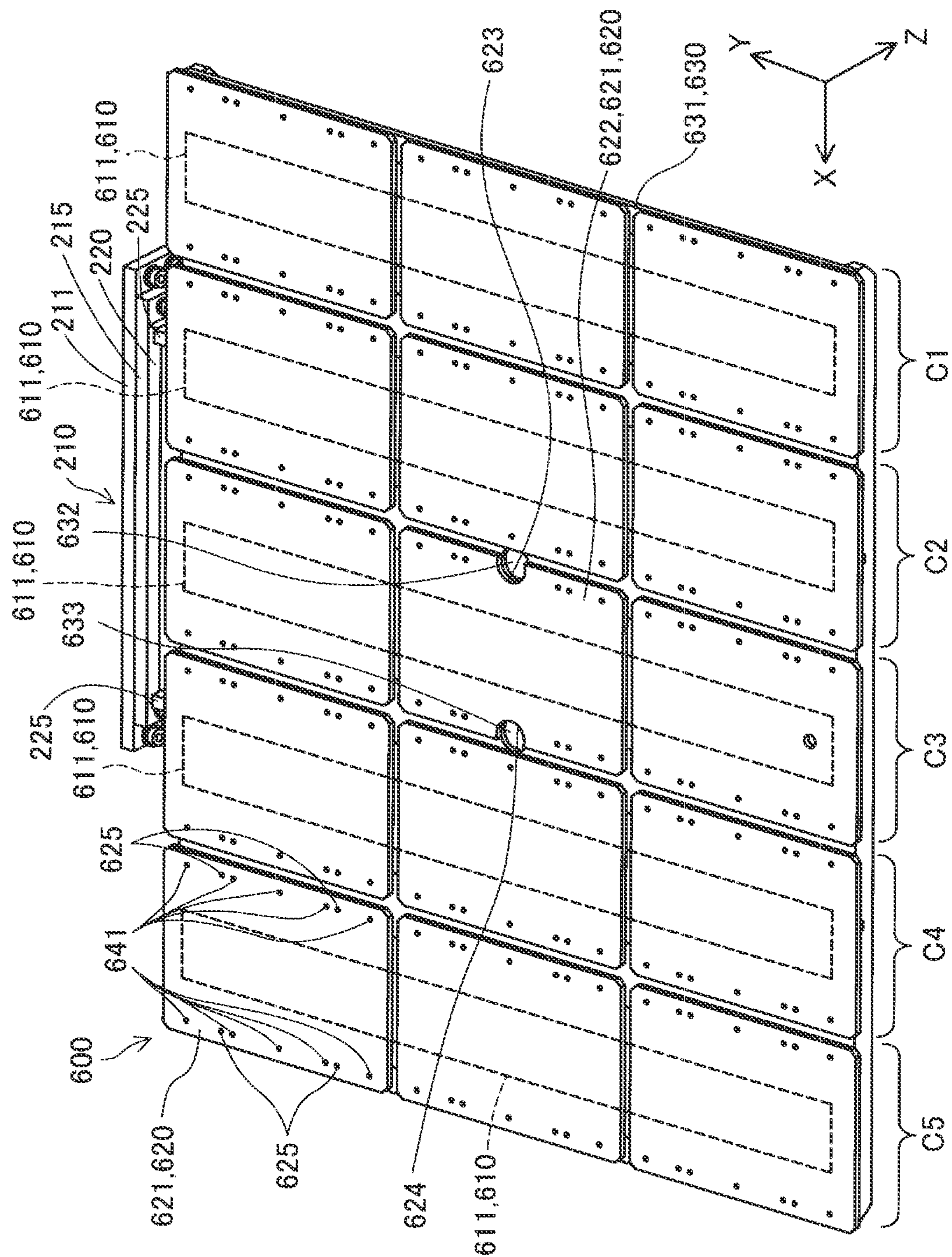
FIG. 5 is a diagram showing a configuration at a lower surface side of a heating section.

FIG. 5 is a diagram showing a configuration at a lower surface side of the heating section 600. FIG. 6 is a diagram showing a configuration at an upper surface side of the heating section 600. The heating section 600 is a member for heating the shaping material stacked in the modeling area on the stage 300. As shown in FIG. 5 and FIG. 6, the heating section 600 has a heater 610, a heating member 620, and a support part 630.

The heating member 620 in the present embodiment is constituted by a plurality of individual members 621 arranged side by side in directions along directions crossing the stacking direction. More particularly, the heating member 620 is constituted by totally fifteen individual members 621 arranged in a 3×5 matrix. The individual members 621 are each formed of metal such as SUS. As shown in FIG. 5, the individual members 621 each have a rectangular plate-like shape, and are arranged so that the fifteen individual members 621 thus arranged form a rectangular shape as a whole when viewed along the Z direction. The row direction of the matrix of the individual members 621 is a direction along the Y axis, and the column direction thereof is a direction along the X axis. The columns constituting the matrix of the individual members 621 are hereinafter referred to as a first column C1, a second column C2, a third column C3, a fourth column C4, and a fifth column C5 from the column located at the extreme −X direction side in some cases. Further, three individual members 621 constituting the n-th column are collectively referred to as the "individual members 621 in the n-th column" in some cases. It should be noted that in FIG. 6, the shapes along the X direction and the Y direction of the individual member 621 located at the extreme −X direction side and at the extreme +Y direction side and a central member 622 as the individual member 621 located at the center in the X direction and the Y direction out of the plurality of individual members 621 are schematically represented by the dashed-dotted lines.

Figure 6:
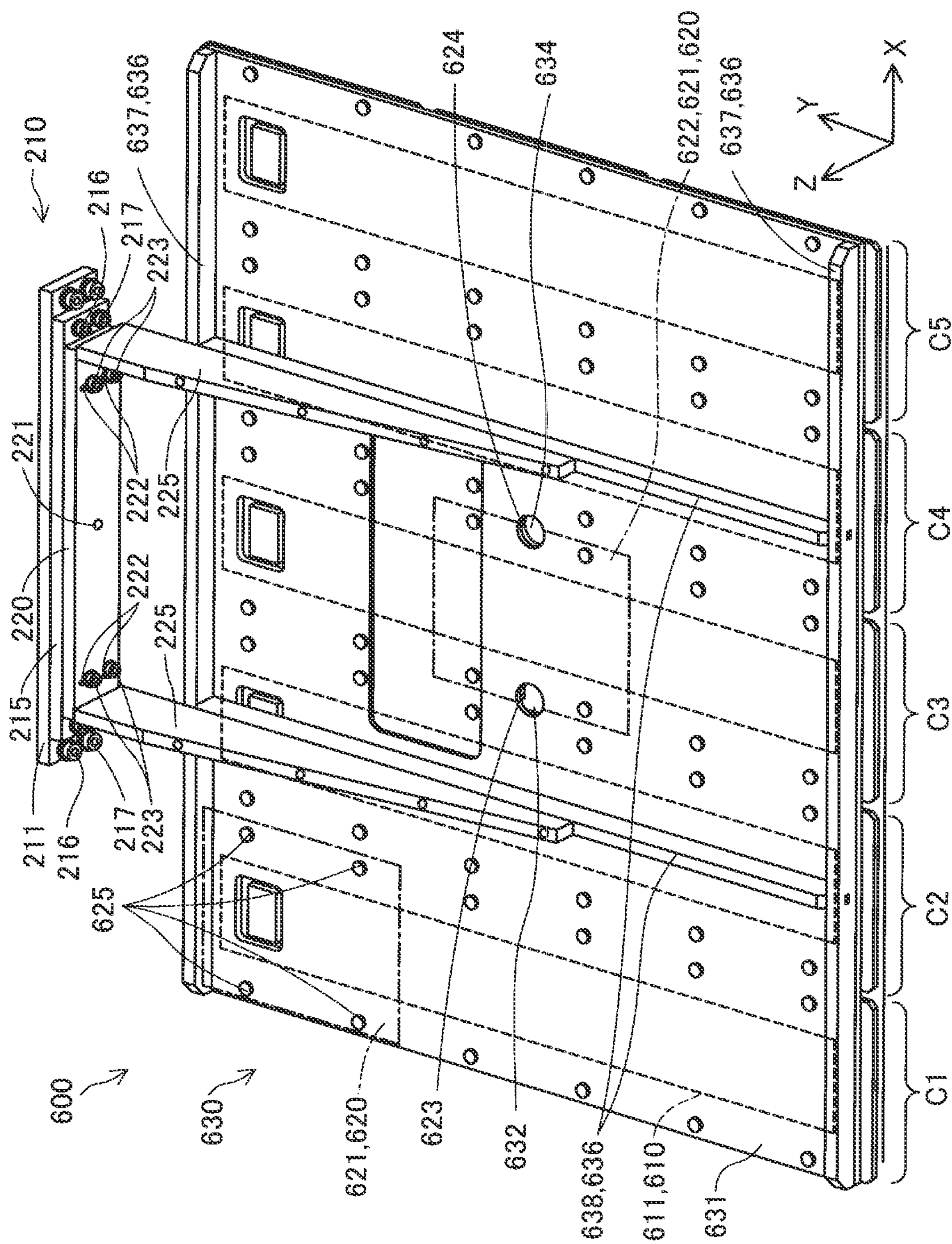
FIG. 6 is a diagram showing a configuration at an upper surface side of the heating section.

As shown in FIG. 5 and FIG. 6, the central member 622 is provided with a first cutout part 623 and a second cutout part 624. The first cutout part 623 and the second cutout part 624 are respectively formed in an end portion at the −X direction side and an end portion at the +X direction side of the central member 622 in the central portion in the Y direction of the central member 622. The outer edges of the first cutout part 623 and the second cutout part 624 are each formed to have a circular arc shape. As described later, the first cutout part 623 is a portion for inserting the first nozzle 61*a* of the first modeling section 200*a* in the Z direction through the heating section 600, and the second cutout part 624 is a portion for inserting the second nozzle 61*b* of the second modeling section 200*b* in the Z direction through the heating section 600. It should be noted that the central member 622 has substantially the same configuration as other individual members 621 except the point that the first cutout part 623 and the second cutout part 624 are formed. When the central member 622 and the other individual members 621 are not particularly distinguished from each other, the central member 622 is referred to simply as the individual member 621 in some cases.

The heater 610 in the present embodiment is constituted by a plurality of individual heaters 611 which are configured to be able to individually be controlled. In FIG. 5 and FIG. 6, the shapes in the X direction and the Y direction of the individual heaters 611 are schematically represented by the dotted lines. In the present embodiment, the heater 610 is constituted by five individual heaters 611. The individual heaters 611 are each formed of a rubber heater having a rectangular plate shape, and are arranged along the X direction so as to correspond to the columns of the individual members 621 in the state in which the longitudinal direction is oriented in the Y direction. More particularly, as shown in FIG. 5, each of the individual heaters 611 is arranged at the +Z direction side of the individual members 621 so as to straddle the three individual members 621 constituting each of the columns of the individual members 621. The individual heaters 611 are electrically coupled to the control section 500 via interconnections not shown, and are individually temperature-controlled by the control section 500. In the present embodiment, the individual heater 611 corresponding to the individual member 621 in the n-th column is also referred to as the "individual heater 611 in the n-th column" in some cases.

The heating member 620 heats the shaping member stacked in the modeling area on the stage 300 with the heat supplied from the heater 610. In the present embodiment, the individual heaters 611 supplies the individual members 621 with heat. More specifically, in the present embodiment, the individual heater 611 in the n-th column heats the three individual members 621 constituting the n-th column to thereby supply these three individual members 621 with the heat. Then, by the heat supplied from the individual heaters 611 to the individual members 621 being transferred to the shaping material stacked in the modeling area, the shaping material stacked in the modeling area is heated.

The support part 630 shown in FIG. 5 and FIG. 6 is a member for supporting the heater 610 and the heating member 620. The support part 630 in the present embodiment has a support plate 631 which has a rectangular plate shape, and supports the heater 610 and the heating member 620, and a frame part 636 for supporting the support plate 631.

As shown in FIG. 6, the support plate 631 has a rectangular plate shape. The support plate 631 is formed of metal such as SUS. The individual heaters 611 described above are bonded to a surface at the −Z direction side of the support plate 631. The individual members 621 described above are each fixed to the support plate 631 via fixation screws 625 so as to sandwich the individual heater 611 in the Z direction with the individual members 621 and the support plate 631. As shown in FIG. 5 and FIG. 6, the fixation screws 625 are disposed at positions not overlapping the individual heater 611 when viewed along the X direction. In the present embodiment, the four fixation screws 625 are disposed with respect to each of the individual members 621.

In the present embodiment, by loosening and then removing all of the four fixation screws 625 disposed with respect to each of the individual members 621, it is possible to detach the individual members 621 from the support plate 631. Further, it is possible to fixedly attach the individual member 621 which is the same as, or different from the individual member 621 having been detached, to the portion of the support plate 631 from which the individual member 621 has been detached via the four fixation screws 625. In other words, the heating section 600 in the present embodiment is configured so that the individual members 621 can individually be attached in a detachable manner.

As shown in FIG. 5 and FIG. 6, a first through hole 632 and a second through hole 633 each having a circular cross-sectional shape are formed in the central portion in the Y direction of the support plate 631. In the state in which the central member 622 is fixed to the support plate 631, when viewed along the Z direction, a part of an outer edge of the first through hole 632 and an outer edge of the first cutout part 623 provided to the central member 622 overlap each other, and similarly, a part of an outer edge of the second through hole 633 and an outer edge of the second cutout part 624 overlap each other. Similarly to the first cutout part 623 described above, the first through hole 632 is a portion for inserting the first nozzle 61*a* in the Z direction through the heating section 600, and similarly to the second cutout part 624, the second through hole 633 is a portion for inserting the second nozzle 61*b* in the Z direction through the heating section 600.

As shown in FIG. 6, the frame part 636 is arranged at the +Z direction side of the support plate 631. The frame part 636 has a pair of support beams 637 which extend in the X direction, and support both end portions in the Y direction of the support plate 631, and a pair of coupling beams 638 which extend in the Y direction, and couple the support beams 637 to each other. The support plate 631 is fixed to the support beams 637 via brackets or the like not shown.

The heating section 600 in the present embodiment is provided with individual adjustment sections each of which can adjust the distance between the individual member 621 and the stage 300 for each of the individual members 621. In the present embodiment, the fixation screws 625 described above, and adjustment screws 641 shown in FIG. 5 function as the individual adjustment sections. The adjustment screws 641 are each formed of a fastening screw penetrating the individual member 621 in the Z direction. In each of both end portions in the X direction of each of the individual members 621, there are disposed the five adjustment screws 641 arranged side by side at regular intervals along the Y direction. The adjustment screws 641 are arranged so as not to overlap the fixation screws 625 and the individual heater 611 when viewed along the Z direction. The adjustment screws 641 are each used with a tip portion at the +Z direction side of the adjustment screw 641 having contact with a lower surface of the support plate 631 in the state in which the individual member 621 is fixed to the support plate 631.

By rotating the adjustment screw 641 to change the length of a portion protruding toward the +Z direction of the adjustment screw 641 with respect to the individual member 621, it is possible to change the position of the individual member 621 with respect to the support plate 631. More specifically, by loosening the fixation screws 625, and then rotating the adjustment screws 641 to change the position of the individual member 621 with respect to the support plate 631, and then tightening the fixation screws 625 once again, it is possible to fix the individual member 621 to the support plate 631 in the state in which the position of the individual member 621 with respect to the support plate 631 is changed. In such a manner, in the present embodiment, the distance between each of the individual members 621 and the stage 300 can be adjusted for each of the individual members 621 using the fixation screws 625 and the adjustment screws 641. The length of the portion protruding toward the +Z direction of the adjustment screw 641 with respect to the individual member 621 is referred to as a protruding amount of the adjustment screw 641 in some cases. It should be noted that it is possible to adjust the tilt of each of the individual members 621 with respect to the stage 300 for each of the individual members 621 using the individual adjustment section. For example, by changing the protruding amount of the adjustment screw 641 disposed in the end portion at the +X direction side of one of the individual members 621 while fixing the protruding amount of the adjustment screw 641 disposed in the end portion at the −X direction side, it is possible to adjust the tilt of that individual member 621 with respect to the stage 300 in the X direction.

As described above, the heating section 600 in the present embodiment is fixed to the movable part 431 via the fixation member 210. As shown in FIG. 5 and FIG. 6, the fixation member 210 has a fixation plate 211, a tilt plate 215, a rotary plate 220, and a pair of support arms 225. The fixation plate 211 is fixed to the movable part 431 shown in FIG. 1. The tilt plate 215 is fixed to the fixation plate 211 so as to be able to adjust the tilts of the tilt plate 215 with respect to the Y axis and the Z axis. The rotary plate 220 is fixed to the tilt plate 215 so as to be able to adjust the tilts of the rotary plate 220 with respect to the X axis and the Z axis. The support arms 225 are fixed to the rotary plate 220. To the support arms 225, there are respectively fixed the coupling beams 638 of the support part 630 described above.

As shown in FIG. 6, the tilt plate 215 is fixed to the fixation plate 211 so that the tilts of the tilt plate 215 with respect to the Y axis and the Z axis can be adjusted using a pair of upper screws 216 and a pair of lower screws 217. The upper screws 216 are disposed in the both end portions in the X direction of the tilt plate 215, respectively. The lower screws 217 are disposed at the −Z direction side of the upper screws 216 in the both end portions in the X direction of the tilt plate 215, respectively. By rotating the pair of upper screws 216, it is possible to adjust the distance between an end portion at the +Z direction side of the tilt plate 215 and the fixation plate 211, and by rotating the pair of lower screws 217, it is possible to adjust the distance between an end portion at the −Z direction side of the tilt plate 215 and the fixation plate 211. Therefore, for example, by rotating the lower screws 217 in the state in which the upper screws 216 are fixed, or by rotating the upper screws 216 in the state in which the lower screws 217 are fixed, it is possible to change the tilt of the tilt plate 215 with respect to the fixation plate 211, and thus, it is possible to adjust the tilts of the tilt plate 215 with respect to the Y axis and the Z axis.

The rotary plate 220 is fixed to the tilt plate 215 so as to be able to adjust the tilts of the rotary plate 220 with respect to the X axis and the Z axis using a pin 221, four groove parts 222, and four rotary adjustment screws 223 corresponding respectively to the groove parts 222. The pin 221 is disposed so as to penetrate a central portion in the X direction and the Y direction of the rotary plate 220, and a central portion in the X direction and the Y direction of the tilt plate 215 in the Y direction. The groove parts 222 are formed two by two in both end portions in the X direction of the rotary plate 220 so as to penetrate the rotary plate 220 in the Z direction. The rotary adjustment screws 223 are inserted into the respective groove parts 222 to fix the rotary plate 220 and the tilt plate 215 to each other. The groove parts 222 are each formed to have a shape constituting a part of a circular arc centering on a portion where the pin 221 is disposed in the X direction and the Z direction. Therefore, in the state in which the rotary adjustment screws 223 are loosened, it is possible to rotate the rotary plate 220 using the pin 221 as a rotary shaft, and thus, it is possible to change the tilts of the rotary plate 220 with respect to the X axis and the Z axis. Further, by tightening the rotary adjustment screws 223 once again, it is possible to fix the rotary plate 220 in the state in which the tilts of the rotary plate 220 with respect to the X axis and the Z axis is changed. In such a manner, it is possible to adjust the tilts of the rotary plate 220 with respect to the X axis and the Z axis.

The fixation member 210 in the present embodiment functions as an adjustment mechanism section configured so as to be able to adjust the tilt of the heating member 620 with respect to the stage 300. More specifically, by changing the tilts of the tilt plate 215 with respect to the Y axis and the Z axis, the tilts of the rotary plate 220, the support arms 225, the frame part 636 and the support plate 631 with respect to the Y axis and the Z axis change, and therefore, the tilts of the whole of the heating member 620 fixed to the support plate 631 in the Y direction and the Z direction with respect to the stage 300 change. Further, by changing the tilts of the rotary plate 220 with respect to the X axis and the Z axis, the tilts of the support arms 225, the frame part 636, and the support plate 631 with respect to the X axis and the Z axis change, and therefore, the tilts of the whole of the heating member 620 in the X direction and the Z direction with respect to the stage 300 change. In such a manner, the fixation member 210 which functions as the adjustment mechanism section is capable of adjusting the tilt of the whole of the heating member 620 with respect to the stage 300.

As shown in FIG. 2, the nozzle opening 62 described above is located between the stage 300 and the heating section 600 in the Z direction. In other words, the heating section 600 is located above a first nozzle opening **62*a* and a second nozzle opening 62*b*. More specifically, the first modeling section 200*a* is arranged so that the first nozzle 61*a* penetrates the heating section 600 along the Z direction via the first through hole 632 and the first cutout part 623, and a portion including a first tip surface 63*a* of the first nozzle 61*a* is located at the −Z direction side of the heating section 600. Similarly, the second modeling section 200*b* is arranged so that the second nozzle 61*b* penetrates the heating section 600 along the Z direction via the second through hole 633 and the second cutout part 624, and a portion including a second tip surface 63***b* of the second nozzle 61*b* is located at the −Z direction side of the heating section 600. Further, in the present embodiment, the heating section 600 is located between the plasticizing heater 58 and the nozzle opening 62 in the Z direction. In other words, the heating section 600 is located below a first plasticizing heater 58*a* of the first plasticizing section 30*a*, and at the same time, is located below a second plasticizing heater 58*b* of the second plasticizing section 30*b*.

It should be noted that in the present embodiment, the heating section 600 is arranged so that the individual member 621 the closest to the stage 300 in the Z direction out of the individual members 621 is located above the nozzle opening 62. For example, the heating section 600 is arranged so that the individual member 621 located in the end portion in the X direction and the Y direction of the heating member 620 is located at the +Z direction side of the nozzle opening 62 even when tilting the whole of the heating member 620 as much as possible to make the end portion the closest to the stage 300 using the adjustment mechanism section, and further, making the individual member 621 located in the end portion the closest to the stage 300 using the individual adjustment section.

The heating member 620 is configured to cover at least the modeling area on the stage 300 when viewed along the Z direction. More specifically, the heating member 620 is configured to cover at least the modeling area when viewed along the Z direction regardless of how the relative position between the heating section 600 and the stage 300 is changed by the transfer mechanism section 400.

Figure 7:
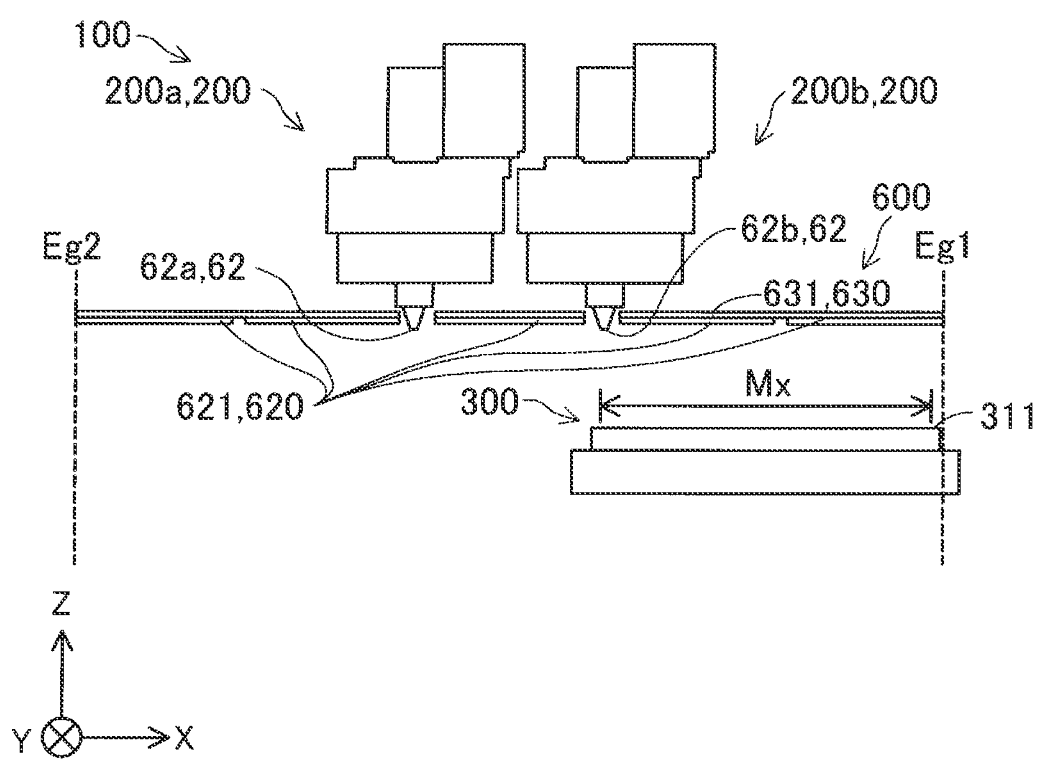
FIG. 7 is a first schematic diagram showing a positional relationship between the heating section and a stage.
Figure 8:
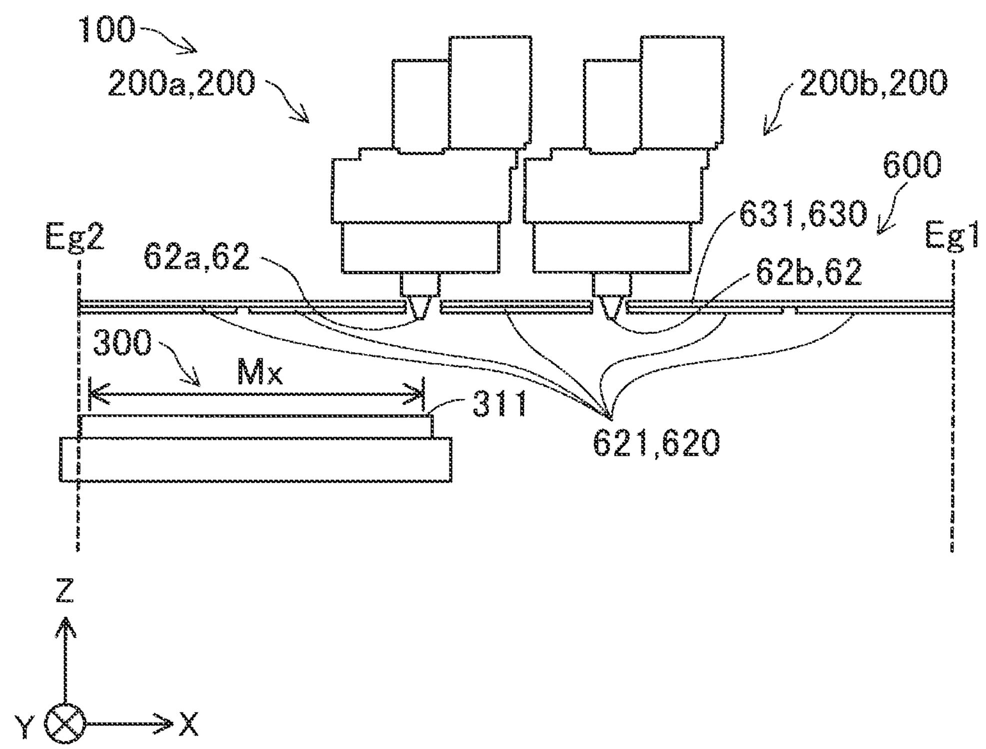
FIG. 8 is a second schematic diagram showing the positional relationship between the heating section and the stage.

FIG. 7 is a first schematic diagram showing an example of the positional relationship between the heating section 600 and the stage 300. FIG. 8 is a second schematic diagram showing an example of the positional relationship between the heating section 600 and the stage 300. FIG. 7 shows a condition in which the modeling section 200 in the present embodiment is located at the extreme −X direction side of the stage 300. FIG. 8 shows a condition in which the modeling section 200 is located at the extreme +X direction side of the stage 300. In FIG. 7 and FIG. 8, a range Mx in the X direction of the modeling area in the present embodiment is represented by the solid arrows. In the example shown in FIG. 7, the second nozzle opening 62*b* of the second nozzle 61*b* is located at a position overlapping an end at the −X direction side of the range Mx when viewed along the Z direction. In the example shown in FIG. 8, the first nozzle opening 62*a* of the first nozzle 61*a* is located at a position overlapping an end at the +X direction side of the range Mx when viewed along the Z direction. In the FIG. 7 and FIG. 8, one end Eg1 and the other end Eg2 in the X direction of the heating member 620 are represented by dotted lines. The one end Eg1 is located at the +X direction side of the other end Eg2.

As shown in FIG. 7 and FIG. 8, the range Mx in the X direction of the modeling area is located between the one end Eg1 and the other end Eg2 regardless of how the relative position in the X direction between the heating section 600 and the stage 300 is changed by the transfer mechanism section 400 in the X direction. In other words, the modeling area is arranged between the one end Eg1 and the other end Eg2 regardless of how the relative position in the X direction between the heating section 600 and the stage 300 is changed by the transfer mechanism section 400 in the X direction. In other words, the modeling area is configured to be arranged at an inner side of an outer circumferential edge of the heating member 620 in the X direction. Similarly, although not shown in the drawings, the modeling area is configured to be arranged at an inner side of an outer circumferential edge of the heating member 620 also in the Y direction.

Figure 9:
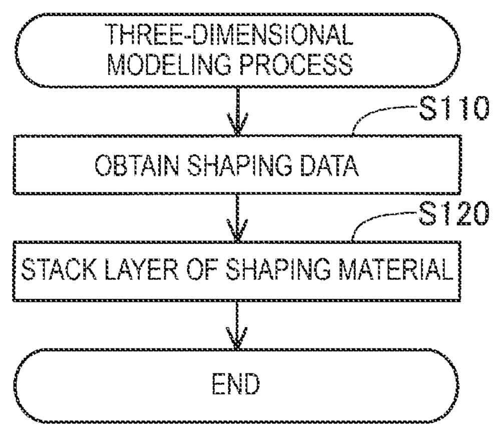
FIG. 9 is a flowchart of a three-dimensional modeling process.

FIG. 9 is a flowchart of a three-dimensional modeling process representing a method of manufacturing the three-dimensional shaped article. The three-dimensional modeling process is executed when the control section 500 receives a startup operation from the user.

In the step S110, the control section 500 obtains shaping data from an external computer, a recording medium, or the like. The shaping data includes shaping pass data representing the transfer path of the nozzles 61 for each layer forming the three-dimensional shaped article. The shaping pass data is associated with ejection amount data representing the ejection amount of the material ejected from the nozzles 61.

Figure 10:
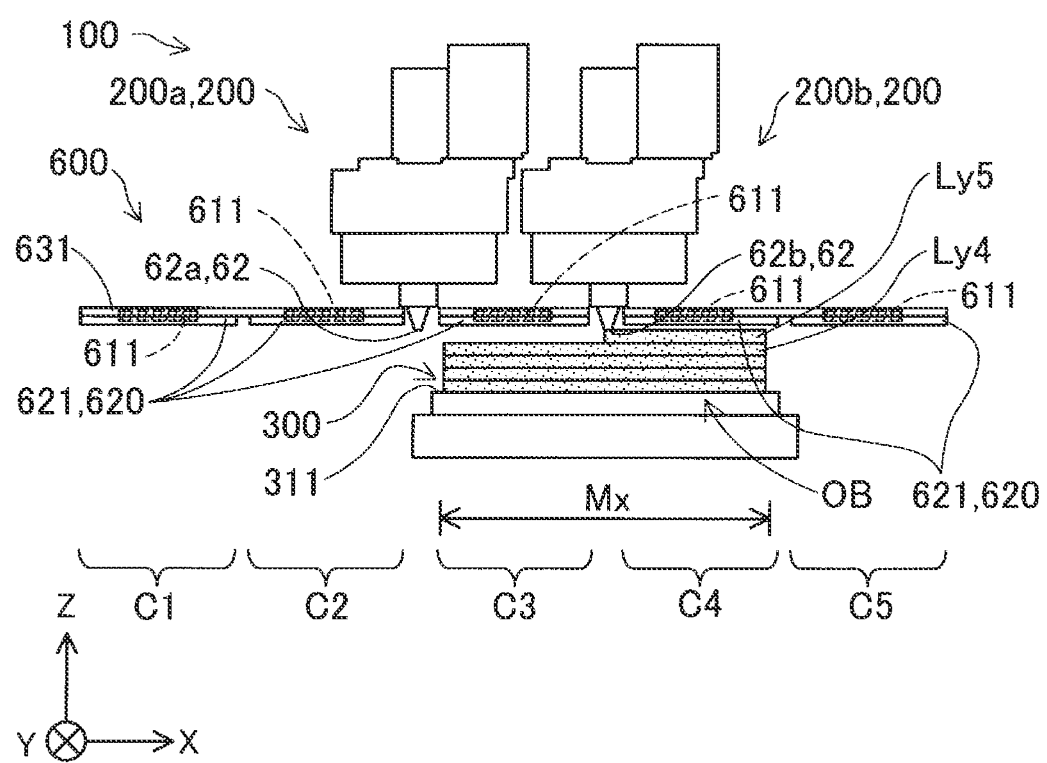
FIG. 10 is a diagram showing an example of a condition in which a three-dimensional shaped article is shaped.

In the step S120, the control section 500 controls the modeling sections 200 and the transfer mechanism section 400 in accordance with the shaping data obtained in the step S110 to stack the layer of the shaping material in the modeling area on the stage 300 to shape the three-dimensional shaped article. More specifically, in the step S120, the control section 500 makes the nozzle opening 62 eject the shaping material generated by controlling the plasticizing section 30 toward the modeling area on the stage 300 while controlling the transfer mechanism section 400 to move the nozzles 61 relatively to the stage 300 to thereby stack the layer of the shaping material in the modeling area. The step S120 is referred to as a stacking step in some cases. FIG. 10 is a diagram showing an example of a condition in which the three-dimensional shaped article OB is shaped. FIG. 10 shows the condition in the process of stacking a fifth layer Ly5 on a fourth layer Ly4 of the three-dimensional shaped article OB in the stacking step in the step S120 shown in FIG. 9. In FIG. 10, the positions of the individual heaters 611 are schematically represented by the dotted lines and the upward-sloping hatching. Further, similarly to FIG. 7 and FIG. 8, in FIG. 10, the range Mx in the X direction of the modeling area in the present embodiment is represented by the solid arrows. When stacking an n-th layer, the control section 500 makes the shaping material to be ejected on an (n−1)-th layer while controlling the heating section 600 to make the heating members 620 heat the shaping material constituting the (n−1)-th layer as a layer having already been stacked in the modeling area on the stage 300. Thus, the adhesiveness between the n-th layer and the (n−1)-th layer is enhanced, and therefore, the strength of the three-dimensional shaped article OB increases. In the example shown in FIG. 10, since the shaping material for forming the fifth layer Ly5 is ejected on the fourth layer Ly4 thus heated, the adhesiveness between the fourth layer Ly4 and the fifth layer Ly5 is enhanced. It should be noted that in the present embodiment, when stacking the first layer immediately on the stage upper surface 311, the control section 500 heats the stage upper surface 311 with the heating members 620. Thus, since warpage or the like due to rapid cooling of the shaping material having been ejected on the stage upper surface 311 is suppressed, the shaping accuracy of the three-dimensional shaped article OB increases.

In the step S120, the control section 500 in the present embodiment controls the individual heater 611 for supplying heat to the individual members 621 which cover at least the modeling area when viewed along the Z direction out of the plurality of individual heaters 611 to thereby heat the shaping material stacked in the modeling area. More particularly, the control section 500 in the present embodiment controls the smallest number of individual heaters 611 for heating the shaping material with the individual members 621 which cover the modeling area when viewed along the Z direction. For example, in the example shown in FIG. 10, the modeling area is covered with the individual members 621 in the third column C3 and the individual members 621 in the fourth column C4. In this case, the control section 500 in the present embodiment starts up only the individual heater 611 in the third column C3 and the individual heater 611 in the fourth column C4 to thereby heat the shaping material stacked in the modeling area only with the individual members 621 in the third column C3 and the individual members 621 in the fourth column C4. The control section 500 can heat the entire modeling area with the individual members 621 while controlling only the smallest number of individual heaters 611, for example, by storing in advance the relationship between control value related to the translation in the X direction and the Y direction of the stage 300 by the transfer mechanism section 400, and the positions in the X direction and the Y direction of the individual members 621, and individually controlling the individual heaters 611 based on this relationship. In another embodiment, it is possible for the control section 500 to start up, for example, all of the individual heaters 611 to thereby supply the heat of the individual heaters 611 to all of the individual members 621 to heat the modeling area in the step S120.

According to the three-dimensional modeling device 100 in the present embodiment described hereinabove, there are provided the heating section 600 having the heater 610 and the heating member 620, the nozzle openings 62 are located between the stage 300 and the heating section 600 in the Z direction, the heating section 600 is configured so that the relative position to the stage 300 changes together with the nozzles 61, and the heating member 620 covers at least the modeling area. According to such an aspect, it is possible to heat the shaping material stacked in the modeling area with the heating member 620 irrespective of the relative positions in the X direction and the Y direction between the nozzles 61 and the stage 300. Therefore, it is possible to heat the layer of the shaping material stacked in the modeling area, and eject the shaping material on the layer of the shaping material thus heated to shape the three-dimensional shaped article using simple control. Further, for example, since the possibility that the shaping material stacked in the modeling area and the heating section 600 make contact with each other is lower compared to the configuration in which the heating section 600 is located between the nozzle openings 62 and the stage 300 in the Z direction, the possibility that the three-dimensional shaped article can accurately be shaped increases.

Further, in the present embodiment, the heating member 620 is constituted by the plurality of individual members 621 arranged side by side in the directions crossing the stacking direction. Therefore, deformation and breakage of the whole of the heating member 620 are suppressed compared to when the heating member 620 is formed of a single member.

Further, in the present embodiment, the heater 610 is constituted by the plurality of individual heaters 611 configured to be able to individually be controlled, and each of the individual heaters 611 supplies the individual members 621 with the heat. Therefore, by individually controlling the individual heaters 611, the possibility that the shaping material stacked in the modeling area can efficiently be heated by the individual members 621 increases.

Further, in the present embodiment, when shaping the three-dimensional shaped article, the control section 500 controls the individual heater 611 for supplying heat to the individual members 621 which cover at least the modeling area when viewed along the Z direction to thereby heat the shaping material stacked in the modeling area. Therefore, due to the heat supplied from the individual heaters 611 individually controlled to the individual members 621, the shaping material stacked in the modeling area is heated irrespective of the relative positions in the X direction and the Y direction between the nozzles 61 and the stage 300. Further, for example, by controlling the smallest number of individual heaters 611 for heating the shaping material with the individual members 621 covering the modeling area when viewed along the Z direction, it is possible to more efficiently heat the shaping material stacked in the modeling area.

Further, in the present embodiment, the heating section 600 is provided with the individual adjustment sections each of which can adjust the distance between the individual member 621 and the stage 300 for each of the individual members 621. According to such an aspect, it is possible to adjust the distance between each of the individual members 621 and the stage 300 for each of the individual members 621 using the individual adjustment section. Therefore, for example, even when a partial deformation or the like occurs in the heating section 600, by adjusting the distance between each of the individual members 621 and the stage 300 using the individual adjustment section, it is possible to uniform the distances between the individual members 621 and the stage 300 in the whole of the heating member 620. Thus, since the possibility that the shaping material stacked in the modeling area can homogenously be heated by the individual members 621 irrespective of the relative positions in the X direction and the Y direction between the nozzles 61 and the stage 300 increases, the possibility that the three-dimensional shaped article can accurately be shaped increases.

Further, in the present embodiment, the heating section 600 is configured so that the individual members 621 can individually be attached in a detachable manner. Therefore, it is possible to detach only the individual member 621 in which, for example, contamination or deformation occurs from the heating section 600, and it is possible to attach the new individual member 621 or the individual member 621 from which the contamination or the deformation is eliminated to the heating section 600.

Further, in the present embodiment, the heating section 600 is arranged so that the individual member 621 the closest to the stage 300 out of the individual members 621 is located above the nozzle opening 62. Thus, since the possibility that the shaping material stacked in the modeling area and the individual member 621 make contact with each other is low, the possibility that the three-dimensional shaped article can accurately be shaped increases.

Further, in the present embodiment, there is provided the adjustment mechanism section configured so as to be able to adjust the tilt of the heating member 620 with respect to the stage 300. According to such an aspect, it is possible for the adjustment mechanism section to adjust the tilt of the whole of the heating member 620 with respect to the stage 300. Therefore, for example, when the whole of the heating section 600 is tilted with respect to the stage 300, by adjusting the tilt of the whole of the heating section 600 with respect to the stage 300 using the adjustment mechanism section, it is possible to uniform the distance between the whole of the heating member 620 and the stage 300. Thus, since the possibility that the shaping material stacked in the modeling area can homogenously be heated by the individual members 621 irrespective of the relative positions in the X direction and the Y direction between the nozzles 61 and the stage 300 increases, the possibility that the three-dimensional shaped article can accurately be shaped increases. Further, in the present embodiment, the plasticizing section 30 is provided with the flat screw, the barrel 50, and the plasticizing heater 58.

Therefore, it is possible to reduce the size of the whole of the three-dimensional modeling device 100.

Further, in the present embodiment, the heating section 600 is located between the plasticizing heater 58 and the nozzle opening 62 in the Z direction. Therefore, the shaping material stacked in the modeling area is prevented from being affected by the heat of the plasticizing heater 58 compared to, for example, an aspect in which the plasticizing heater 58 is located between the nozzle opening 62 and the heating section 600 in the Z direction.

Further, in the present embodiment, the transfer mechanism section 400 moves the nozzles 61 in the Z direction with respect to the stage 300, and moves the stage 300 in the X direction and the Y direction with respect to the nozzles 61 to thereby change the relative positions between the nozzles 61 and the stage 300. Thus, it is possible to change the relative position between the nozzles 61 and the stage 300 without moving the heating member 620, which is configured so as to cover the modeling area when viewed along the Z direction, in the X direction and the Y direction with respect to the stage 300. Therefore, it is possible for the transfer mechanism section 400 to more stably change the relative position between the nozzles 61 and the stage 300. In particular, even when the heating member 620 is grown in size in the X direction and the Y direction in order to cover the modeling area, and thus, the weight of the heating member 620 increases, it is possible to more stably change the relative position between the nozzles 61 and the stage 300.

Here, the material of the three-dimensional shaped article used in the three-dimensional modeling device 100 described above will be described. In the three-dimensional modeling device 100, it is possible to shape the three-dimensional shaped article using a variety of materials such as a material having a thermoplastic property, a metal material, or a ceramic material as a chief material. Here, the "chief material" means the material playing a central role for forming the shape of the three-dimensional shaped article, and means the material having a content rate no lower than 50% by weight in the three-dimensional shaped article. The shaping material described above includes those obtained by melting these chief materials alone, or those obtained by melting some of the components included therein are melted together with the chief material in paste form.

When using the material having a thermoplastic property as the chief material, the material plasticizes in the plasticizing section 30 to thereby generate the shaping material.

As the material having the thermoplastic property, it is possible to use, for example, the thermoplastic resin materials described below.

Examples of Thermoplastic Resin Material general-purpose engineering plastic such as polypropylene resin (PP), polyethylene resin (PE), polyacetal resin (POM), polyvinyl chloride resin (PVC), polyamide resin (PA), acrylonitrile-butadiene-styrene resin (ABS), polylactic resin (PLA), polyphenylene sulfide resin (PPS), polyether ether ketone (PEEK), polycarbonate (PC), modified polyphenylene ether, polybutylene terephthalate, or polyethylene terephthalate, and engineering plastic such as polysulfone, polyether sulfone, polyphenylene sulfide, polyarylate, polyimide, polyamide-imide, polyetherimide, or polyether ether ketone In the material having a thermoplastic property, there can be mixed pigment, metal, ceramic, and in addition, an additive agent such as wax, flame retardant, antioxidant, or thermal stabilizer, and so on. In the plasticizing section 30, the material having a thermoplastic property is plasticized by the rotation of the screw 40 and heating by the plasticizing heater 58 to be transformed into the melted state.

It is desirable for the material having a thermoplastic property to be heated at a temperature no lower than the glass-transition point and then ejected from the nozzles 61 in the completely melted state. For example, when using ABS resin, it is desirable to be heated at about 200° C. when ejected from the nozzles 61.

In the three-dimensional modeling device 100, the following metal material, for example, can be used as the chief material instead of the material having a thermoplastic property described above. In this case, it is desirable that the components to be melted when generating the shaping material are mixed in a powder material obtained by powdering the metal material described below, and then the mixture is loaded into the plasticizing section 30 as the material MR.

Examples of Metal Material magnesium (Mg), iron (Fe), cobalt (Co), chromium (Cr), aluminum (Al), titanium (Ti), copper (Co), or nickel (Ni) as a single metal, or alloys including one or more of these metals Examples of Alloy maraging steel, stainless steel, cobalt-chromium-molybdenum, titanium alloy, nickel alloy, aluminum alloy, cobalt alloy, or cobalt-chrome alloy In the three-dimensional modeling device 100, it is possible to use a ceramic material as the chief material instead of the metal material described above. As the ceramic material, it is possible to use, for example, oxide ceramics such as silicon dioxide, titanium dioxide, aluminum oxide, or zirconium oxide, and non-oxide ceramics such as aluminum nitride. When using the metal material or the ceramic material described above as the chief material, it is possible for the shaping material ejected on the stage 300 to be made to cure by calcination.

The powder material of the metal material or the ceramic material to be loaded as the material MR into the material supply section 20 can also be a mixed material obtained by mixing a plurality of types of single metal powder, alloy powder, or ceramic material powder. Further, the powder material of the metal material or the ceramic material can also be coated with, for example, the thermoplastic resin as illustrated above or other thermoplastic resin. In this case, it is also possible to assume that the thermoplastic resin is melted to develop the fluidity in the plasticizing section 30.

It is also possible to add, for example, the following solvent to the powder material of the metal material or the ceramic material to be loaded as the material MR into the material supply section 20. As the solvent, it is also possible to use one species selected from the following, or two or more species selected from the following in combination.

Examples of Solvent water; a (poly)alkylene glycol monoalkyl ether group such as ethylene glycol monomethyl ether, ethylene glycol monoethyl ether, propylene glycol monomethyl ether, or propylene glycol monoethyl ether; an ester acetate group such as ethyl acetate, n-propyl acetate, isopropyl acetate, n-butyl acetate, or isobutyl acetate; an aromatic hydrocarbon group such as benzene, toluene, or xylene; a ketone group such as methyl ethyl ketone, acetone, methyl isobutyl ketone, ethyl-n-butyl ketone, diisopropyl ketone, or acethylacetone; an alcohol group such as ethanol, propanol, or butanol; a tetraalkylammonium acetate group; a sulfoxide series solvent such as dimethyl sulfoxide, or diethyl sufoxide; a pyridine series solvent such as pyridine, γ-picoline, or 2,6-lutidine; tetraalkylammonium acetate (e.g., tetrabutylammonium acetate); an ionic liquid such as butyl carbitol acetate Besides the above, it is also possible to add, for example, the following binder to the powder material of the metal material or the ceramic material to be loaded as the material MR into the material supply section 20.

Figure 11:
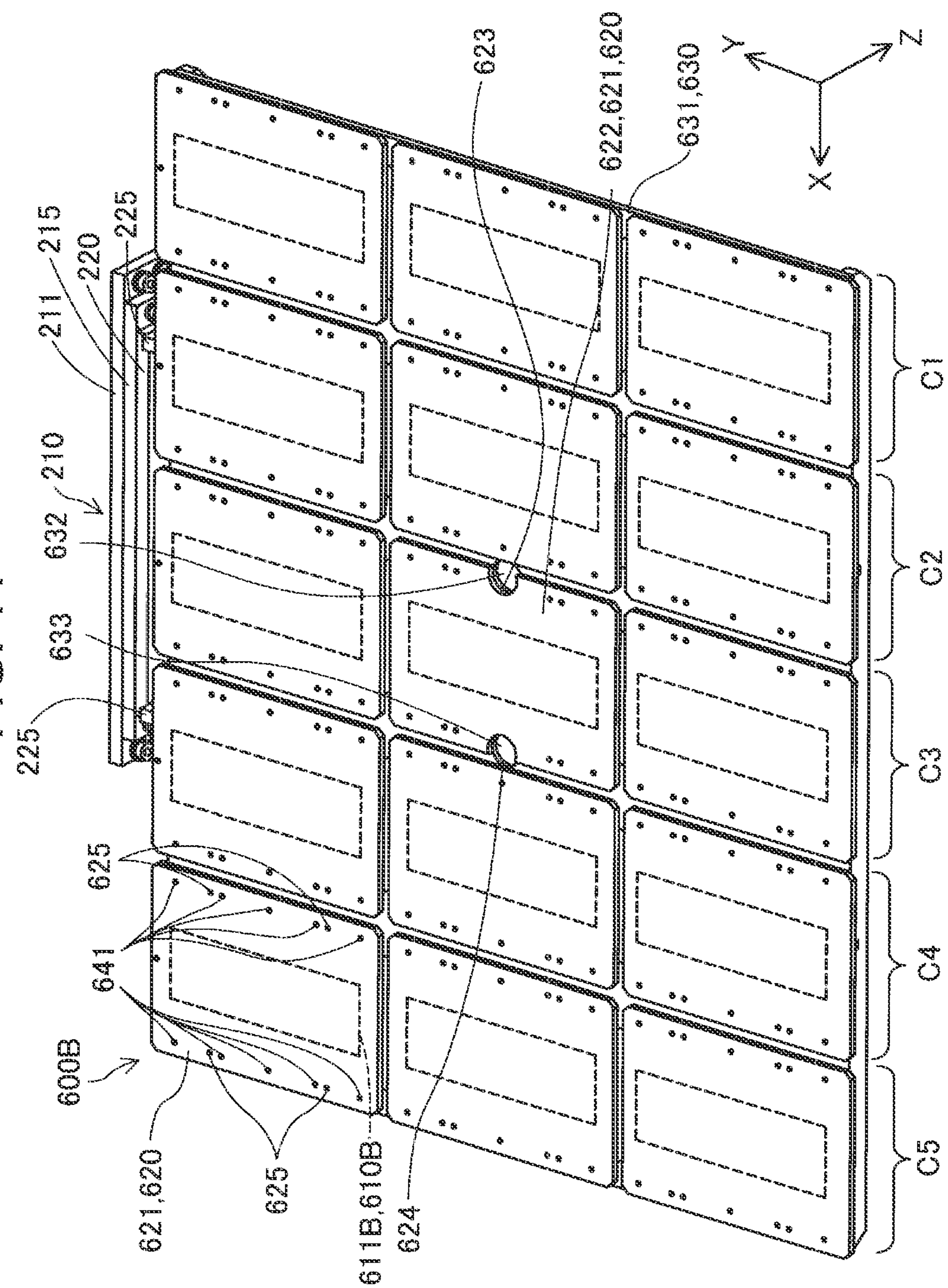
FIG. 11 is a diagram showing a configuration at a lower surface side of a heating section in a second embodiment.

Examples of Binder acrylic resin, epoxy resin, silicone resin, cellulosic resin, or other synthetic resin, or polylactic acid (PLA), polyamide (PA), polyphenylene sulfide (PPS), polyether ether ketone (PEEK), or other thermoplastic resin B. Second Embodiment FIG. 11 is a diagram showing a configuration at a lower surface side of a heating section 600B of the three-dimensional modeling device 100 according to a second embodiment. In the present embodiment, individual heaters 611B constituting a heater 610B of the heating section 600B are disposed so as to correspond respectively to the individual members 621. Similarly to FIG. 5 and FIG. 6 described above, in FIG. 11, the shapes in the X direction and the Y direction of the individual heaters 611B are schematically represented by the dotted lines. Out of the configuration of the three-dimensional modeling device 100, the portions not particularly described are substantially the same as those in the first embodiment.

In the present embodiment, the individual heaters 611B and the individual members 621 are disposed so as to correspond one-to-one to each other. In other words, in the present embodiment, the fifteen individual heaters 611B are disposed so as to correspond one-to-one to the fifteen individual members 621. The individual heaters 611B are disposed one by one at the +Z direction side of the respective individual members 621 similarly to the first embodiment.

In the step S120 in the three-dimensional modeling process shown in FIG. 9, similarly to the first embodiment, the control section 500 controls the smallest number of individual heaters 611B for heating the shaping material by the individual members 621 covering the modeling area on the stage 300 when viewed along the Z direction. In the present embodiment, since the individual heaters 611B are disposed so as to correspond to the individual members 621, in the step S120, the control section 500 is capable of heating the entire modeling area with the individual members 621 while controlling only a smaller number of the individual heaters 611B compared to the first embodiment.

According also to the three-dimensional modeling device 100 in the present embodiment described hereinabove, it is possible to heat the layer of the shaping material stacked in the modeling area, and eject the shaping material on the layer of the shaping material thus heated to shape the three-dimensional shaped article using simple control. In particular, in the present embodiment, the individual heaters 611B are disposed so as to correspond to the individual members 621. Therefore, by individually controlling the individual heaters 611B, the possibility that the shaping material stacked in the modeling area can efficiently be heated by the individual members 621 further increases.

C. Other Embodiments (C-1) In the embodiments described above, the individual heaters 611 are each formed of the rubber heater having the rectangular plate shape. In contrast, the individual heaters 611 can have, for example, a circular plate shape instead of the rectangular plate shape. Further, the individual heaters 611 can each be formed of, for example, a halogen heater, a nichrome wire heater, or a carbon heater instead of the rubber heater.

(C-2) In the embodiments described above, the fifteen individual members 621 are arranged in the 3×5 matrix so that the individual members 621 form the rectangular shape as a whole when viewed along the Z direction. In contrast, the number of the individual members 621 is not required to be fifteen, and can be no smaller than two and no larger than fourteen, or can also be no smaller than sixteen. Further, the individual members 621 are not required to be arranged in a matrix, and can be arranged side by side along one direction such as the X direction or the Y direction. Further, the individual members 621 are not required to be arranged so as to form the rectangular shape as a whole, and for example, the individual members 621 can be arranged so as to form a circular shape, an elliptical shape, a triangular shape, or a polygonal shape with vertexes no less than five as a whole.

(C-3) In the embodiments described above, the heating member 620 is constituted by the plurality of individual members 621. In contrast, it is possible for the heating member 620 to be formed of a single member.

(C-4) In the embodiments described above, the heater 610 is constituted by the plurality of individual heaters 611 which are configured to be able to individually be controlled. In contrast, the heater 610 is not required to be constituted by the plurality of individual heaters 611, and can be formed of, for example, a single rubber heater, a halogen heater, a nichrome wire heater, or a carbon heater.

(C-5) In the embodiments described above, the heating section 600 is provided with the individual adjustment sections. In contrast, the heating section 600 is not required to be provided with the individual adjustment sections. Therefore, the heating section 600 is not required to be configured so that the distance between the individual member 621 and the stage 300 can be adjusted for each of the individual members 621. In this case, for example, the individual members 621 can be fixed to the support plate 631 simply with only the fixation screws 625.

(C-6) In the embodiments described above, the heating section 600 is configured so that the individual members 621 can individually be attached in a detachable manner. In contrast, the heating section 600 is not required to be configured so that the individual members 621 can individually be attached in a detachable manner.

(C-7) In the embodiments described above, there is disposed the adjustment mechanism section. In contrast, the adjustment mechanism section is not required to be provided. Therefore, the three-dimensional modeling device 100 is not required to be configured so as to be able to adjust the tilt of the heating member 620 with respect to the stage 300. In this case, for example, the heating section 600 can be fixed to the movable part 431 of the third electric actuator 430 via a fixation member which does not function as the adjustment mechanism section.

(C-8) In the embodiments described above, the plasticizing section 30 is provided with the screw 40 as a flat screw, and the barrel 50. In contrast, the plasticizing section 30 is not required to be provided with the flat screw and the barrel 50. For example, it is possible for the plasticizing section 30 to be provided with an in-line screw, and to rotate the in-line screw to thereby plasticize the material to generate the shaping material.

(C-9) In the embodiments described above, the three-dimensional modeling device 100 is provided with the two nozzles 61. In contrast, the number of the nozzles 61 can be one, or no smaller than three. Further, the three-dimensional modeling device 100 according to the embodiments described above is provided with the two modeling sections 200, but the number of the modeling sections 200 can be one, or can also be no smaller than three. It is possible for the single modeling section 200 to be provided with a plurality of nozzles 61.

(C-10) In the embodiments described above, the modeling sections 200 are each configured as a head for ejecting the material formed to have the pellet shape. In contrast, the modeling sections 200 can each be configured as, for example, a head which plasticizes the material shaped like a filament and then ejects the material.

D. Other Aspects

The present disclosure is not limited to the embodiments described above, but can be implemented in a variety of aspects within the scope or the spirit of the present disclosure. For example, the present disclosure can also be implemented in the following aspects. The technical features in the embodiments described above corresponding to the technical features in each of the aspects described below can arbitrarily be replaced or combined in order to solve some or all of the problems of the present disclosure, or to achieve some or all of the advantages of the present disclosure. Further, the technical feature can arbitrarily be eliminated unless described in the present specification as an essential element.

(1) According to a first aspect of the present disclosure, there is provided a three-dimensional modeling device. The three-dimensional modeling device includes a plasticizing section configured to plasticize a material to generate a shaping material, a stage on which the shaping material is stacked, a nozzle which has a nozzle opening, and is configured to eject the shaping material from the nozzle opening toward a modeling area on the stage, a transfer mechanism section configured to change a relative position between the nozzle and the stage, and a heating section having a heater and a heating member configured to heat the shaping material stacked in the modeling area with heat supplied from the heater. The nozzle opening is located between the stage and the heating section in a stacking direction of the shaping material, the heating section is configured so that a relative position to the stage changes together with the nozzle, and the heating member covers at least the modeling area when viewed along the stacking direction.

According to such an aspect, it is possible to heat the shaping material stacked in the modeling area with the heating member irrespective of the relative position between the nozzle and the stage in a direction crossing the stacking direction. Therefore, it is possible to heat the layer of the shaping material stacked in the modeling area, and eject the shaping material on the layer of the shaping material thus heated to shape the three-dimensional shaped article using simple control.

(2) In the aspect described above, the heating member may be constituted by a plurality of individual members arranged in a direction crossing the stacking direction. According to such an aspect, deformation and breakage of the whole of the heating member are suppressed compared to when the heating member is formed of a single member.

(3) In the aspect described above, the heater may be constituted by a plurality of individual heaters configured so as to be able to individually be controlled, and the individual heaters may supply the individual members with the heat. According to such an aspect, by individually controlling the individual heaters, the possibility that the shaping material stacked in the modeling area can efficiently be heated by the individual members increases.

(4) In the aspect described above, the individual heaters may be disposed so as to correspond respectively to the individual members. According to such an aspect, by individually controlling the individual heaters, the possibility that the shaping material stacked in the modeling area can efficiently be heated by the individual members further increases.

(5) In the aspect described above, there may further be included a control section configured to control the plasticizing section, the transfer mechanism section, and the heating section to thereby shape a three-dimensional shaped article, wherein when shaping the three-dimensional shaped article, the control section may control the individual heater configured to supply the heat to the individual member which covers at least the modeling area when viewed along the stacking direction to thereby heat the shaping material stacked in the modeling area. According to such an aspect, the shaping material stacked in the modeling area is heated with the heat supplied from the individual heater individually controlled to the individual member irrespective of the relative position between the nozzle and the stage in a direction crossing the stacking direction. Further, for example, by starting up the smallest number of individual heaters for heating the shaping material with the individual members covering the modeling area when viewed along the stacking direction, it is possible to more efficiently heat the shaping material stacked in the modeling area.

(6) In the aspect described above, the heating section may be provided with an individual adjustment section configured to adjust a distance between the individual member and the stage for each of the individual members. According to such an aspect, it is possible to adjust the distance between each of the individual members and the stage for each of the individual members using the individual adjustment section.

(7) In the aspect described above, the heating section may be configured so that the individual members are individually attached in a detachable manner. According to such an aspect, it is possible to detach only the individual member in which contamination or deformation occurs from the heating section, and it is possible to attach the new individual member or the individual member from which the contamination or the deformation is eliminated to the heating section.

(8) In the aspect described above, the heating section may be arranged so that the closest one of the individual members to the stage in the stacking direction is located above the nozzle opening. According to such an aspect, since the possibility that the shaping material stacked in the modeling area and the individual member make contact with each other is low, the possibility that the three-dimensional shaped article can accurately be shaped increases.

(9) In the aspect described above, there may further be included an adjustment mechanism section configured to adjust a tilt of the heating member with respect to the stage. According to such an aspect, it is possible for the adjustment mechanism section to adjust the tilt of the whole of the heating member with respect to the stage.

(10) In the aspect described above, the plasticizing section may include a flat screw which has a groove formation surface provided with a groove, and rotates, a barrel which has an opposed surface opposed to the groove formation surface, and is provided with a communication hole formed in the opposed surface, and a plasticizing heater configured to heat the material supplied between the flat screw and the barrel. According to such an aspect, it is possible to reduce the size of the whole of the three-dimensional modeling device.

(11) In the aspect described above, the heating section may be located between the plasticizing heater and the nozzle opening in the stacking direction. According to such an aspect, the shaping material stacked in the modeling area is prevented from being affected by the heat of the plasticizing heater compared to an aspect in which the plasticizing heater is located between the nozzle opening and the heating section in the stacking direction.

(12) In the aspect described above, the transfer mechanism section may move the plasticizing section and the nozzle in the stacking direction with respect to the stage, and may move the stage in a direction crossing the stacking direction to thereby change the relative position between the nozzle and the stage. According to such an aspect, it is possible to change the relative position between the nozzle and the stage without moving the heating member configured so as to cover at least the modeling area when viewed along the stacking direction in the direction crossing the stacking direction with respect to the stage. Therefore, it is possible for the transfer mechanism section to more stably change the relative position between the nozzle and the stage.

(13) According to a second aspect of the present disclosure, there is provided a method of manufacturing a three-dimensional shaped article. The method of manufacturing a three-dimensional shaped article includes a stacking step of ejecting a shaping material generated by plasticizing a material toward a modeling area on a stage from a nozzle opening while moving a nozzle having the nozzle opening relatively to the stage to stack a layer of the shaping material in the modeling area. In the stacking step, the shaping material stacked in the modeling area is heated by a heating member while moving the heating member arranged above the nozzle opening relatively to the stage together with the nozzle, and the heating member covers at least the modeling area when viewed along a stacking direction of the shaping material.

According to such an aspect, it is possible to heat the shaping material stacked in the modeling area with the heating member irrespective of the relative position between the nozzle and the stage in a direction crossing the stacking direction. Therefore, it is possible to heat the layer of the shaping material stacked in the modeling area, and eject the shaping material on the layer of the shaping material thus heated to shape the three-dimensional shaped article using simple control.

What is claimed is:

1. A three-dimensional modeling device comprising:

a plasticizing section configured to plasticize a material to generate a shaping material; a stage on which the shaping material is stacked;

a nozzle which has a nozzle opening, and is configured to eject the shaping material from the nozzle opening toward a modeling area on the stage;

a transfer mechanism section configured to change a relative position between the nozzle and the stage;

a heating section having a heater and a heating member configured to heat the shaping material stacked in the modeling area with heat supplied from the heater; and an adjustment mechanism section configured to adjust, separately, a tilt of the heating member with respect to the stage in a first axial direction and a second axial direction, the first axial direction and the second axial direction being orthogonal to each other and the first axial direction and the second axial direction being orthogonal to a stacking direction of the shaping material, wherein the nozzle opening is located between the stage and the heating section in the stacking direction, the heating section is configured so that a relative position to the stage changes together with the nozzle, the heating member covers at least the modeling area when viewed along the stacking direction, the heating section is fixed to the plasticizing section via the adjustment mechanism section, the adjustment mechanism section includes a first member fixed to the transfer mechanism section, a second member provided with a first hole into which a first screw is inserted in the first axial direction and a second hole into which a pin is inserted in the first axial direction, the second member being fixed to the first member by the first screw, a third member provided with a third hole into which the pin is inserted in the first axial direction and a groove into which a second screw is inserted in the first axial direction, the third member being fixed to the second member by the pin and the second screw, and an arm connecting the heating section, the groove provided in the third member has a shape such that the third member rotates around the pin, the third member connecting the heating section via the arm, the second member is configured to adjust the tilt of the heating member with respect to the stage in the first axial direction by rotating the first screw, and the third member is configured to adjust the tilt of the heating member with respect to the stage in the second axial direction by rotating the third member around the pin.

2. The three-dimensional modeling device according to claim 1, wherein the heating member is constituted by a plurality of individual members arranged in a direction crossing the stacking direction.

3. The three-dimensional modeling device according to claim 2, wherein the heater is constituted by a plurality of individual heaters configured so as to be able to individually be controlled, and the individual heaters supply the individual members with the heat.

4. The three-dimensional modeling device according to claim 3, wherein the individual heaters are disposed so as to correspond respectively to the individual members.

5. The three-dimensional modeling device according to claim 3, further comprising:

a control section configured to control the plasticizing section, the transfer mechanism section, and the heating section to thereby shape a three-dimensional shaped article, wherein when shaping the three-dimensional shaped article, the control section controls an individual heater of the plurality of individual heaters that is configured to supply the heat to the individual member of the plurality of individual members which covers at least the modeling area when viewed along the stacking direction to thereby heat the shaping material stacked in the modeling area.

6. The three-dimensional modeling device according to claim 2, wherein the heating section is provided with an individual adjustment section configured to adjust a distance between the individual member and the stage for each of the individual members.

7. The three-dimensional modeling device according to claim 2, wherein the heating section is configured so that the individual members are individually attached in a detachable manner.

8. The three-dimensional modeling device according to claim 2, wherein the heating section is arranged so that closest one of the individual members to the stage in the stacking direction is located above the nozzle opening.

9. The three-dimensional modeling device according to claim 2, wherein the nozzle is accommodated in a cutout provided in an individual member of the plurality of individual members.

10. The three-dimensional modeling device according to claim 1, wherein the plasticizing section includes a flat screw which has a groove formation surface provided with a groove, and rotates, a barrel which has an opposed surface opposed to the groove formation surface, and is provided with a communication hole formed in the opposed surface, and a plasticizing heater configured to heat the material supplied between the flat screw and the barrel.

11. The three-dimensional modeling device according to claim 10, wherein the heating section is located between the plasticizing heater and the nozzle opening in the stacking direction.

12. The three-dimensional modeling device according to claim 1, wherein the transfer mechanism section moves the nozzle in the stacking direction with respect to the stage, and moves the stage in a direction crossing the stacking direction with respect to the nozzle to thereby change the relative position between the nozzle and the stage.

* * * * *